US005936821A

United States Patent [19]

Busse et al.

[11] Patent Number: 5,936,821

[45] Date of Patent: Aug. 10, 1999

[54] OVERVOLTAGE PROTECTION PLUG WITH FAIL-SAFE DEVICE HAVING OPTIONAL VISUAL FAIL-FAIL SIGNAL INDICATOR

[75] Inventors: Ralf-Dieter Busse; Joachim Stark; Carstein Storbeck, all of Berlin, Germany

[73] Assignee: Krone Aktiengesellschaft, Berlin-Zehlendorf, Germany

[21] Appl. No.: 09/081,805

[22] Filed: May 20, 1998

[30] Foreign Application Priority Data

May 30, 1997 [DE] Germany .......................... 197 22 580

[51] Int. Cl.$^{6}$ ...................................................... H02H 5/04

[52] U.S. Cl. ............................ 361/104; 361/124; 361/91

[58] Field of Search ................................ 361/20, 21, 62, 361/103, 104, 107, 111, 117, 115, 118, 119, 124, 91, 760, 761, 736, 796; 337/31, 158, 186, 208, 206; 340/662, 619

[56] References Cited

U.S. PATENT DOCUMENTS

| | | | |
|---|---|---|---|
| 4,438,477 | 3/1984 | Cawley | 361/119 |
| 4,862,311 | 8/1989 | Rust et al. . | |
| 4,907,118 | 3/1990 | Hames | 361/56 |
| 5,157,580 | 10/1992 | Hegner et al. | 361/119 |
| 5,539,801 | 7/1996 | Herh et al. | 379/1 |
| 5,574,614 | 11/1996 | Busse et al. | 361/119 |
| 5,583,734 | 12/1996 | McMills et al. | 361/124 |
| 5,671,126 | 9/1997 | Verding et al. | 361/796 |
| 5,808,533 | 9/1998 | Buscher et al. | 335/202 |

FOREIGN PATENT DOCUMENTS

| | | |
|---|---|---|
| 0 647 005 A1 | 4/1995 | European Pat. Off. . |
| 0 755 105 A1 | 1/1997 | European Pat. Off. . |
| 44 37 122 A1 | 4/1996 | Germany . |
| 195 19 785 C1 | 8/1998 | Germany . |

*Primary Examiner*—Jeffrey Gaffin
*Assistant Examiner*—Kim Huynh
*Attorney, Agent, or Firm*—McGlew and Tuttle, P.C.

[57] ABSTRACT

An overvoltage protection plug is provided, including at least one voltage-limiting component with an associated fuse element and a fail-safe device (6). The fuse element trips the fail-safe device (6) in the event of thermal overheating. The fail-safe device can optionally be upgraded with visual fail-safe signaling, wherein the voltage-limiting component is arranged with the associated fuse element and the fail-safe device (6) as an enclosed unit on a first printed circuit board (3) to which, optionally, the visual fail-safe signaling, which is arranged on a separate, second printed circuit board (10), can be assigned.

20 Claims, 2 Drawing Sheets

OVERVOLTAGE PROTECTION PLUG WITH FAIL-SAFE DEVICE HAVING OPTIONAL VISUAL FAIL-FAIL SIGNAL INDICATOR

FIELD OF THE INVENTION

The invention relates to an overvoltage protection plug with at least one voltage-limiting component with an associated fuse element, and a fail-safe device, the fuse element tripping the fail-safe device in the event of thermal overheating.

BACKGROUND OF THE INVENTION

Particularly in telecommunications applications and data technology applications, overvoltage protection plugs are used to protect the wired-up double wires against overvoltages and overcurrents caused by technical defects or external disturbances such as lightning strikes. To this end, such plugs have a component which limits the voltage and, generally, the current as well and to which a fuse element, generally in the form of a solder pellet, is assigned. If an overcurrent lasting for a relatively long time occurs in the voltage-limiting component, then the solder pellet melts as a result of the heat losses occurring on the component, as a result of which a mechanical fail-safe device generally shortcircuits the wires to ground. This is necessary since the overvoltages or overcurrents that occur could possibly adversely affect the serviceability of the components. In order to make it easier to identify which fail-safe device has tripped, various visual fail-safe signaling means are already known, lightemitting diodes being used predominantly.

Various solutions are known for signaling the tripping of a fail-safe device. When the voltage-limiting component overheats, it is also possible, in addition to the short-circuit from a and b to ground, for a parallel process to be initiated (indirect signaling). The safety-relevant process of fail-safe tripping in this case remains entirely uninfluenced by the signaling process, but the fact that the relationship is only approximate is disadvantageous. Even if the two processes are optimally matched, thermal constellations are always possible in which this fail-safe device has tripped but signaling does not take place, or vice versa.

Solutions for direct signaling means are known, in which, once a solder pellet has melted, the moving part of the fail-safe device makes contact, by means of spring force on reaching its limit position, not only with the contact points for the wires a and b but also with a further contact point for signaling. The design must in this case be configured such that the contact point for signaling is designed to have weak springing in order to avoid impeding the fail-safe movement. In any case, it is necessary to avoid an excessively low contact force occurring, or even no contact being made whatsoever, by the third contact point on the two contact points a-ground and b-ground.

It is known for the components for the overvoltage protection plug to be arranged on a printed circuit board. Since the visual fail-safe signaling is not always desirable or necessary, two types of printed circuit boards are therefore manufactured, namely one with and one without visual fail-safe signaling. The additional components for visual fail-safe signaling also result in the geometric dimensions of the printed circuit board being increased. However, in order to allow the same housing to be used for both printed circuit board versions, this is designed to match the larger printed circuit board. Furthermore, when the plug is arranged in a housing, this housing must be designed such that the visual fail-safe signaling can be perceived. To this end, the housing has an opening, out of which the light-emitting diode arranged at the plug end can project so that it can be perceived visually. This opening must then be closed f or the plug version without visual fail-safe signaling.

SUMMARY AND OBJECTS OF THE INVENTION

The invention is thus based on the object of providing an overvoltage protection plug which is constructed in a compact manner, can easily be retrofitted, and necessitates only minor design changes to a housing.

According to the invention, an overvoltage protection plug is provided including at least one voltage-limiting component with an associated fuse element, and a fail-safe device. Thee fuse element trips the fail-safe device in the event of thermal overheating, which fail-safe device can optionally be upgraded with visual fail-safe signaling. The voltage-limiting component is arranged with the associated fuse element and the fail-safe device as an enclosed unit on a first printed circuit board to which, optionally, the visual fail-safe signaling, which is arranged on a separate, second printed circuit board, can be assigned.

By designing the overvoltage protection plug as a closed unit on a printed circuit board and arranging the visual fail-safe signaling on a separate printed circuit board which can be assigned to the first printed circuit board if required, simple retrofitting of the visual fail-safe signaling means is achieved without any components having to be fitted retrospectively. Since the geometric dimensions of the first printed circuit board are therefore always the same, there is no need to make any spatial provisions for the visual fail-safe signaling means when used in a housing, and this allows a more compact construction. Particularly if the second printed circuit board is arranged above the first printed circuit board, the components of the second printed circuit board can in this case be arranged in the gaps between the components of the first printed circuit board. A further advantage is the fact that the first printed circuit board can be manufactured for more widespread applicability, and thus in greater quantities, thus reducing its unit costs. Furthermore, this also makes retrofitting easy for use in housings, without the structure of the housing having to be changed retrospectively. To this end, all that is necessary is to provide guides for the two printed circuit boards in the housing, so that the printed circuit boards can easily be inserted or removed, as required. The associated housing part is then designed to be transparent, for visual perception. In this case, it is possible to design the associated housing part so that it is always transparent irrespective of whether the visual fail-safe signaling means is or is not required, or else for the corresponding housing parts to be replaced for retrofitting. Furthermore, the design of separate printed circuit boards makes it possible for an aperture to be arranged centrally in the first printed circuit board, so that the first printed circuit board can be moved by means of a suitable pulling hook.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
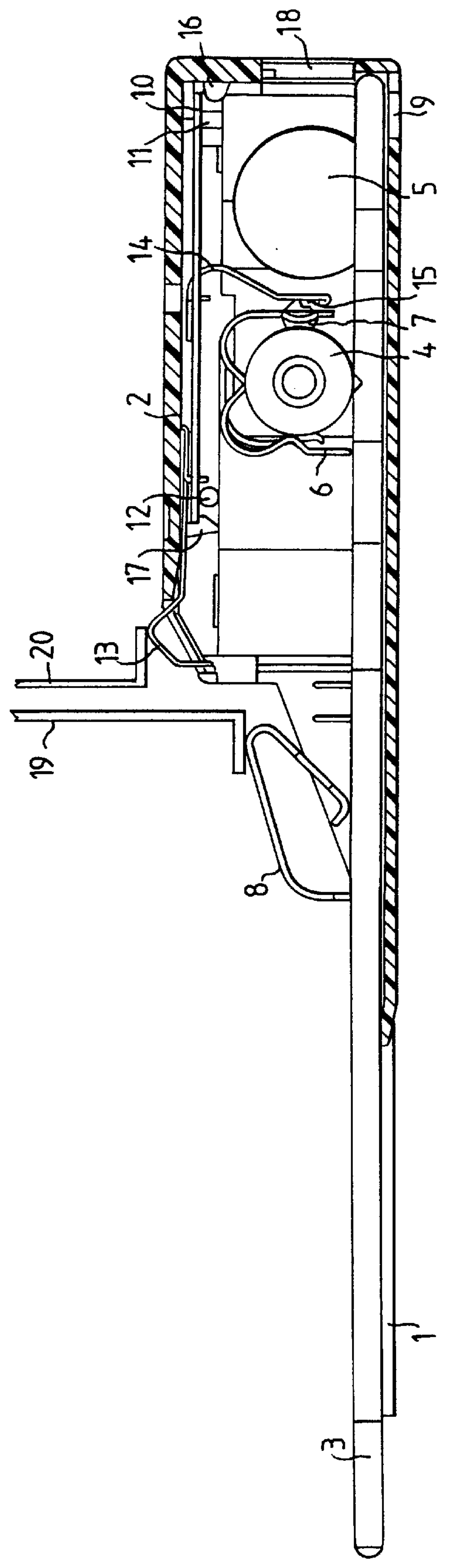
FIG. 1 is a side view of the overvoltage protection plug with visual fail-safe signaling in a housing.

Referring to the drawings in particular, FIG. 1 shows the side view of a housing which is to be fitted with an overvoltage protection plug and comprises a housing lower part 1 and a housing upper part 2. A three-pole overvoltage suppressor 4, as a voltage-limiting component, and two PTC thermistors 5, as current-limiting components, are arranged on a first printed circuit board 3. The overvoltage suppressor 4 and the PTC thermistors 5 are designed to be cylindrical and are arranged in grooves and/or slots in the printed circuit board 3, where they are then electrically conductively connected, for example by means of reflow soldering. Once the overvoltage suppressor 4 and the PTC thermistors 5 have been soldered, a fail-safe contact 6 is snapped onto the overvoltage suppressor 4. The fail-safe device 6 is additionally fixed via a slot in the printed circuit board 3. The fail-safe contact 6 is in this case permanently connected to ground potential via the central electrode of the overvoltage suppressor 4. A fuse element, which is designed as a solder pellet 7 and is permanently connected to the fail-safe contact 6, is arranged between the overvoltage suppressor 4 and the fail-safe contact 6. If the overvoltage suppressor 4 is overheated, the solder pellet 7 melts and the short-circuit bracket of the fail-safe contact 6, which is prestressed in the normal state, moves to the left toward the overvoltage suppressor 4, the short-circuit bracket making contact, in the unstressed state, with the two outer electrodes of the overvoltage suppressor 4. However, in consequence, the two outer electrodes are at ground potential, as well as a double wire connected to the outer electrodes. Furthermore, a sprung ground contact 8 is arranged on the printed circuit board 3, via which ground contact 8 the ground potential is passed to the printed circuit board 3. The sprung ground contact 8 is in this case arranged outside the housing, so that the latter is relatively freely accessible. The mating piece which makes contact and forms the ground rail 19 may thus be bent, for example as a lug, out of the mounting trough of a distribution board in a manner that is convenient for production. An aperture 9 is located centrally in the end region of the printed circuit board 3 and allows the printed circuit board 3 to be pulled by means of an associated tool, in which case it is possible for the tool to be inserted into the interior of the housing through an aperture 18 in the housing lower part 1. The printed circuit board 3 is pressed into the housing lower part 2 for installation, and is connected to the latter such that it latches in place. In the inserted state, the printed circuit board 3 is completely covered on the underneath by the housing lower part 1 so that there is no need for any additional passivation to protect conductor tracks against being touched or against being damaged.

The visual fail-safe signaling means, which may be required, is provided by a second printed circuit board 10. A light-emitting diode 11, a current-limiting resistor 12, an operating-voltage contact 13 and a connecting contact 14 are arranged on the printed circuit board 10. The light-emitting diode 11 and the current-limiting resistor 12 are preferably both designed as surface mounted devices and form the actual fail-safe signaling means. The operating-voltage contact 13 is designed, in the same way as the ground contact 8, to be sprung and extends out of the housing upper part 2 so that its mating piece for making contact can likewise be produced by bending out a lug in a signal plate 20 which carries the operating voltage. The design of the ground contacts 8 and that of the operating-voltage contacts 13 allow simultaneous contact with up to 200 double wires by means of one plate, without any additional intermediate pieces. When the fail-safe contact 6 trips, the connecting contact 14 makes the connection between the first printed circuit board 3 and the second printed circuit board 10. For this purpose, the connecting contact 14 is prestressed against the solder pellet 7, an insulation layer 15 being arranged between the solder pellet 7 and the connecting contact 14. Until the fail-safe contact 6 trips, the circuit for the light-emitting diode 11 is open. If the solder pellet 7 now melts, then the prestressed connecting contact 14 moves in the direction of the fail-safe contact 6, making contact with the latter underneath the solder pellet 7 and the insulation layer 15, by means of a bent projection. As a result of the fact that the fail-safe contact 6 and the connecting contact 14 move in the same direction, the visual fail-safe signaling does not result in any weakening of the actual fail-safe process. Instead of the solder pellet 7 with the insulation layer 15, an electrical insulator having a similar temperature-dependent melting behavior could also be used. Like the printed circuit board 3, the printed circuit board 10 is pressed into the housing upper part 2 such that it latches in place. To this end, the printed circuit board 10 is pushed behind a projection 16 and is pressed upward, where it is held by a latching tab 17 that grips around it. The housing upper part 2 is designed to be at least partially transparent, so that the visual fail-safe signaling can be perceived outside the housing. Since the light-emitting diode 11 is mechanically protected by the housing, it can be designed as a surface mounted device diode which radiates to the side.

Figure 3:
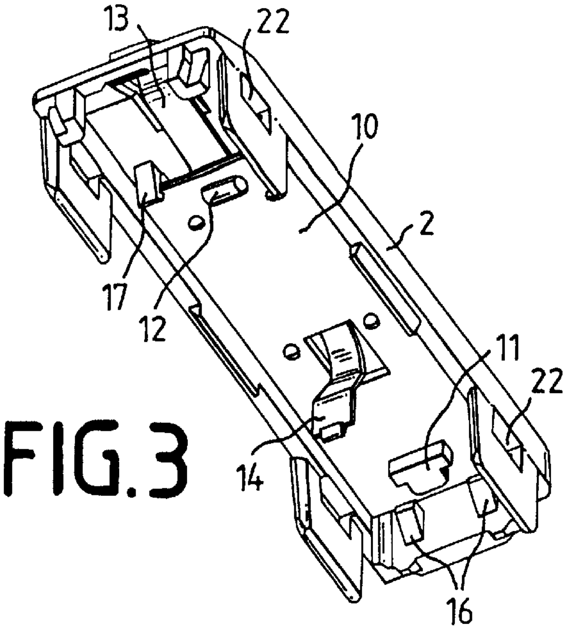
FIG. 3 is a perspective plan view of the second printed circuit board with the associated housing part.
Figure 2:
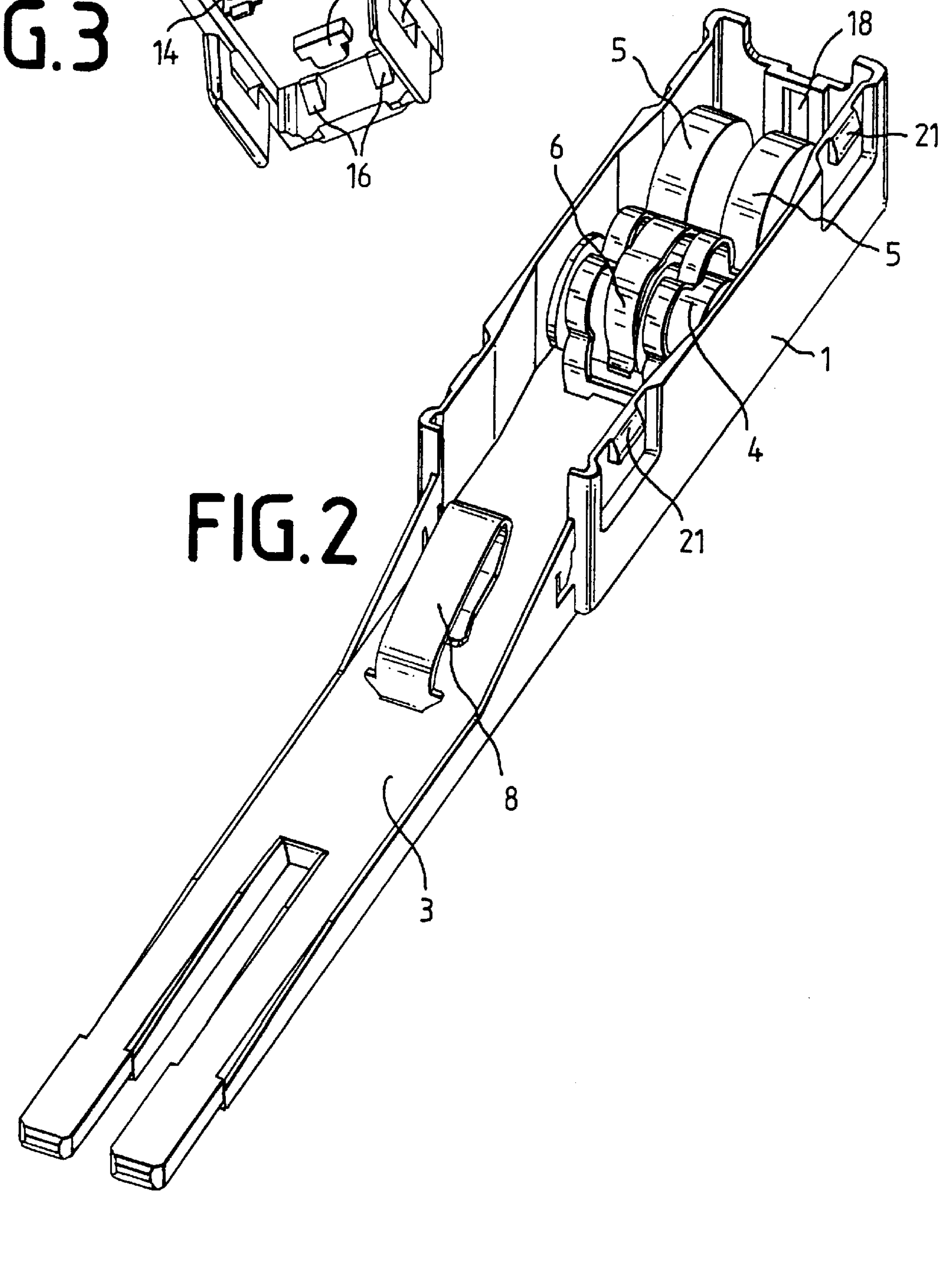
FIG. 2 is a perspective plan view of the first printed circuit board with the associated housing part.

In order to assemble the overvoltage protection plug, the printed circuit boards 3, 10 are connected in a latching manner to the associated housing lower part 1 and, respectively, the housing upper part 2, as is shown, respectively, in FIG. 2 and FIG. 3. The housing lower part 1 and the housing upper part are then latched to one another, the latching elements 21 in the housing lower part 1 snapping into corresponding latching openings 22 in the housing upper part 2, and making a firm connection.

While a specific embodiment of the invention has been shown and described in detail to illustrate the application of the principles of the invention, it will be understood that the invention may be embodied otherwise without departing from such principles.

What is claimed is:

1. An overvoltage protection plug, comprising:

at least one voltage-limiting component with an associated fuse element;

a fail-safe device, the fuse element tripping the fail-safe device in the event of thermal overheating, wherein said fail-safe device can optionally be upgraded with visual fail-safe signaling unit; and a first printed circuit board, said voltage-limiting component being arranged with the associated fuse element and said fail-safe device as an enclosed unit on said first printed circuit board to which the visual fail-safe signaling unit, which is arranged on a separate, second printed circuit board, can be assigned.

2. The overvoltage protection plug as claimed in claim 1, further comprising: a common housing defining an enclosure of said enclosed unit, said printed circuit boards being arranged at least partially in said common housing whose surface facing the fail-safe signaling is designed to be transparent.

3. The overvoltage protection plug as claimed in claim 2, wherein the printed circuit boards are mounted in a latching manner, at a defined distance from one another, in said housing.

4. The overvoltage protection plug as claimed in claim 2, wherein said first printed circuit board is designed with a sprung ground contact which, when the printed circuit board is arranged partially inside the housing, is located outside said housing.

5. The overvoltage protection plug as claimed in claim 1, wherein said first printed circuit board includes slots and/or grooves, said voltage-limiting component being essentially cylindrical and being arranged in said slots and/or grooves in said printed circuit board.

6. The overvoltage protection plug as claimed in claim 1, wherein said first printed circuit board includes slots and said fail-safe device is snapped onto said voltage-limiting component and is fixed in a slot in the printed circuit board.

7. The overvoltage protection plug as claimed in claim 1, wherein the voltagelimiting component is designed as an overvoltage suppressor.

8. The overvoltage protection plug as claimed in claim 1, wherein said first printed circuit board has an aperture in an end region.

9. The overvoltage protection plug as claimed in claim 1, wherein said visual fail-safe signaling unit includes a light-emitting diode, a limiting resistor, an operating-voltage contact and a connecting contact which connects said first printed circuit board and said second printed circuit board electrically to one another when said fail-safe device trips.

10. The overvoltage protection plug as claimed in claim 9, wherein said light-emitting diode is provided as printed circuit board surface mounted devices.

11. The overvoltage protection plug as claimed in claim 9, wherein said operating-voltage contact is designed as a sprung contact which is arranged outside the housing when the printed circuit board is located partially inside the housing.

12. The overvoltage protection plug as claimed in claim 1, further comprising a connecting contact wherein said fail-safe device and said visual fail-safe signaling unit are assigned the same fuse element, which is arranged partially between the fail-safe device and said voltage-limiting component and partially between said fail-safe device and said connecting contact, said connecting contact being pre-stressed by the fuse element so that, when the fail-safe device for the connecting contact trips, a movement can be carried out in the direction of the fail-safe device.

13. The overvoltage protection plug as claimed in claim 12, wherein the fuse element is a solder pellet, and an insulation layer is arranged between said solder pellet and said connecting contact.

14. The overvoltage and current protection plug as claimed in claim 12, wherein the fuse element is an electrical insulator with a temperature-dependent melting behavior.

15. An overvoltage protection plug, comprising:

at least one voltage-limiting component;

a fuse element associated with said at least one voltage-limiting component;

a fail-safe device, the fuse element tripping the fail-safe device in the event of thermal overheating;

a first printed circuit board;

a housing, said voltage-limiting component being arranged with said associated fuse element and said fail-safe device as an enclosed unit in said housing on said first printed circuit board, said housing defining a space for receiving a second printed circuit board;

a second printed circuit board separate from said first circuit board, said second printed circuit board being removably connectable to said housing; and a visual fail-safe signaling element arranged on second printed circuit board.

16. The overvoltage protection plug as claimed in claim 15, wherein said first printed circuit board and said second printed circuit board are arranged at least partially in said housing, said housing having a housing first part and a housing second part with a surface facing said fail-safe signaling element, said housing second part being substantially transparent, said first printed circuit board and said second printed circuit board being mounted in a latching manner, at a defined distance from one another, in said housing.

17. The overvoltage protection plug as claimed in claim 16, wherein:

said printed circuit board includes a resilient ground contact which is located outside said housing when said first printed circuit board is arranged partially inside said housing; and said visual fail-safe signaling element includes a light-emitting diode, a limiting resistor, an operating-voltage contact and a connecting contact which connects said first printed circuit board and said second printed circuit board electrically when said fail-safe device trips, at least one of said light-emitting diode and said limiting resistor being mounted on a surface of said second printed circuit board.

18. An overvoltage protection plug, comprising:

at least one voltage-limiting component;

a fuse element associated with said at least one voltage-limiting component;

a fail-safe device, the fuse element tripping the fail-safe device in the event of thermal overheating;

a first printed circuit board;

a housing, said voltage-limiting component being arranged with said associated fuse element and said fail-safe device as an enclosed unit in said housing on said first printed circuit board, said housing defining a space for receiving a second printed circuit board supporting a visual fail-safe signaling element arranged on second printed circuit board.

19. The overvoltage protection plug as claimed in claim 18, further comprising:

a second printed circuit board separate from said first circuit board, said second printed circuit board being removably connectable to said housing;

said visual fail-safe signaling element being arranged on second printed circuit board.

20. The overvoltage protection plug as claimed in claim 19, wherein:

said first printed circuit board and said second printed circuit board are arranged at least partially in said housing, said housing having a housing first part and a housing second part with a surface facing said fail-safe signaling element, said housing second part being substantially transparent, said first printed circuit board and said second printed circuit board being mounted in a latching manner, at a defined distance from one another, in said housing;

said printed circuit board includes a resilient ground contact which is located outside said housing when said first printed circuit board is arranged partially inside said housing; and said visual fail-safe signaling element includes a light-emitting diode, a limiting resistor, an operating-voltage contact and a connecting contact which connects said first printed circuit board and said second printed circuit board electrically when said fail-safe device trips, at least one of said light-emitting diode and said limiting resistor being mounted on a surface of said second printed circuit board.

* * * * *